Figure 1:
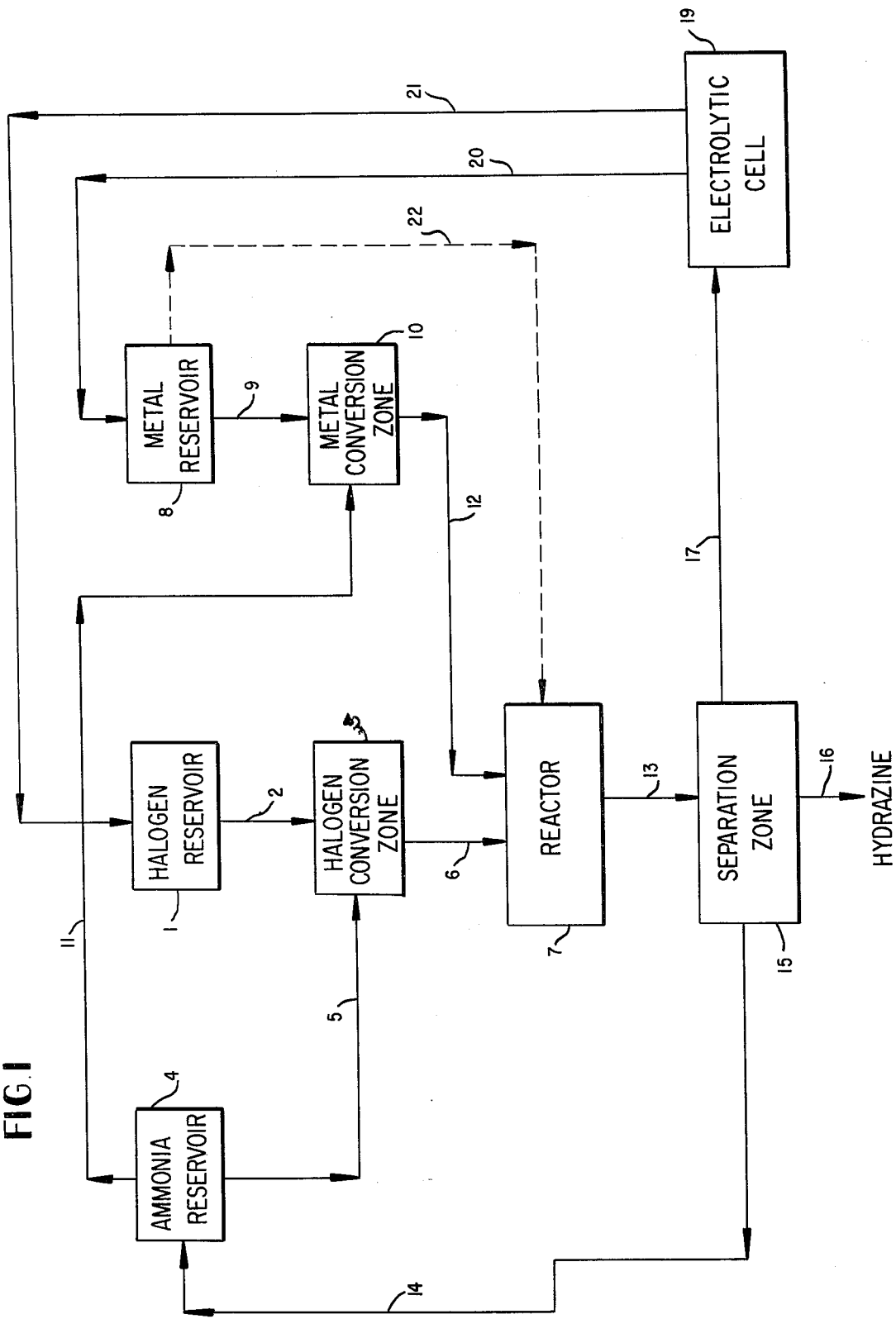

United States Patent [19]

Pursley

[11] 4,082,838
[45] Apr. 4, 1978

[54] PROCESS FOR PREPARING HYDRAZINE

[76] Inventor: John A. Pursley, 333 Woodley Ct., Santa Barbara, Calif. 93105

[21] Appl. No.: 194,755

[22] Filed: May 10, 1962

Related U.S. Application Data

[63] Continuation-in-part of Ser. No. 823,261, Jun. 26, 1959, Pat. No. 3,034,861, which is a continuation-in-part of Ser. No. 306,694, Aug. 27, 1952, abandoned.

[51] Int. Cl.$^2$ .............................................. C01B 21/16
[52] U.S. Cl. ..................................... 423/408; 204/63
[58] Field of Search ........................... 23/190; 204/63; 423/408

[56] References Cited

U.S. PATENT DOCUMENTS

| 2,373,800 | 4/1945 | Acken et al. | 423/407 |
| 2,710,248 | 6/1955 | Sisler et al. | 423/407 |
| 3,034,861 | 5/1962 | Pursley | 423/407 |

OTHER PUBLICATIONS

Smith, College Chemistry, 6th ed., (1946), p. 489.

Primary Examiner—Stephen J. Lechert, Jr.
Attorney, Agent, or Firm—Schuyler, Birch, Swindler, McKie & Beckett

EXEMPLARY CLAIM

1. A continuous cyclic process for preparing hydrazine comprising the step of:
    (a) contacting in a non-aqueous medium at least one haloamine of the formula $NH_2$—X, wherein X is a halogen, with at least one material selected from the group consisting of the metals of Groups IA and IIA and the amides thereof to provide an anhydrous mixture containing hydrazine and a metal halide;
    (b) separating said hydrazine from said anhydrous mixture;
    (c) subjecting the hydrazine-poor residue of step (b) to direct current electrolysis to separate the metal component and the halogen component of said metal halide from each other; and
    (d) recycling said metal for reaction with fresh haloamine in step (a).

16 Claims, 2 Drawing Figures

U.S. Patent  April 4, 1978  Sheet 2 of 2  4,082,838

PROCESS FOR PREPARING HYDRAZINE

This application is a continuation-in-part of applicant's copending application Ser. No. 823,261, filed June 26, 1959, now U.S. Pat. No. 3,034,861, which in turn is a continuation-in-part of application Ser. No. 306,694, filed Aug. 27, 1952, now abandoned.

This invention relates to a process for preparing hydrazine and more particularly to a process for continuously producing hydrazine wherein reactants employed in the hydrazine synthesis are provided by electrolyzing by-products obtained in the method.

Hydrazine has found rather widespread utility in recent years. It has been found to be useful as a rocket fuel, a curing agent for synthetic elastomers such as the polyurethanes, and as an intermediate for valuable specialty chemicals such as B-hydroxy naphthalazine, a brilliant fluorescent yellow pigment.

In spite of its usefulness since hydrazine was first isolated by Curtius in 1887 (Ber. 20, 1632), methods have not yet been devised which are suitably adapted for its production on a commercial scale. Of the available methods, perhaps the best known is the Raschig method, described in U.S. Pat. No. 910,858 and in J. Am. Chem. Soc. 78, 1619 (1951). In accordance with the Raschig method, sodium hypochlorite is reacted with ammonia at a fairly rapid rate to form chloramine, the exact reaction being given by the following chemical equation:

$$NaOCl + NH_3 \rightarrow NH_2Cl + NaOH \qquad (1)$$

Reaction (1) is carried out in the presence of excess ammonia which then reacts with the chloramine and sodium hydroxide formed therein to give hydrazine in accordance with the following chemical equation:

$$NH_2Cl + NH_3 + NaOH \rightarrow H_2N-NH_2 + NaCl + H_2O \qquad (2)$$

Reaction (2) however, is a relatively slow one and it competes with a third reaction with the result that the yield of hydrazine is undesirably reduced.

The competing third reaction can be represented by the following equation:

$$2NH_2Cl + H_2N-NH_2 \rightarrow 2NH_4Cl + N_2 \qquad (3)$$

In accordance with the present invention a new process for preparing hydrazine is provided which has a higher reaction rate for the synthesis step than processes heretofore available.

Accordingly, it is the primary object of the present invention to provide a more reliable process for preparing hydrazine at substantially increased yields as compared to prior art methods therefor.

It is an additional object of the present invention to provide a method for preparing hydrazine which is particularly adapted for utilization in continuous commercial scale operations.

It is another object of the present invention to provide a continuous process for preparing hydrazine wherein raw material and operating expenditures are significantly lower than those observed in conventional processes therefor.

It is a particular object of the present invention to provide a method for preparing hydrazine wherein ammonia, a relatively inexpensive material, is essentially the only raw material used up in a synthesis capable of operating continuously at commercially economic levels.

In accordance with the present invention process at least one haloamine is reacted with at least one material selected from the group consisting of the metals of Groups IA and IIA, and the amides thereof to provide an anhydrous mixture comprising hydrazine and a metal halide, hydrazine is recovered from said mixture, and said metal halide is subjected to electrolysis to provide free metal and free halide which are employed to prepare reactants for the hydrazine synthesis. The classification of the metals herein referred to is the periodic classification of elements according to Deming. A copy of the Deming Periodic Table appears at page 314 of the Handbook of Chemistry and Physics, 27th edition, published by Chemical Rubber Publishing Company in 1943.

Haloamines contemplated for utilization in the method of the present invention correspond to the formula $NH_2X$ wherein X is a halogen. Chloramine, bromamine, and fluoramine provide the preferred embodiments of the haloamine.

The amides of the metals of group IA metals, commonly known as alkali metals, e.g. sodium, potassium, caesium and rubidium and the amides of the metals of group IIA, conventionally referred to as alkaline earth metals, e.g. strontium and barium are most advantageously employed in practicing the present process. The amides of lithium (group IA) and magnesium and calcium (group IIA), generally are less preferred embodiments of the metal amides.

The haloamine utilized in the present method preferably is prepared from free halogen produced in the electrolysis step of the method. Although any suitable technique for preparing the haloamine satisfactorily can be employed, generally gaseous halogen diluted with an inert gas such as nitrogen is contacted and thereby reacted with ammonia gas to provide the haloamine. Preferably the conditions under which the halogen and ammonia are contacted are such that high yields of the haloamine are provided. One such technique is disclosed in U.S. Pat. No. 2,726,935.

The amides contemplated for use in the present invention preferably are obtained by reacting ammonia with free metal provided in the electrolysis step of the process. Any suitable method can be employed in synthesizing the amide in accordance with the method of the present invention. For example, the free metal can be contacted with ammonia which is either in the vapor or liquid state to provide the amide. A detailed description of one technique which suitably can be employed to prepare the amide is given in applicant's copending application Ser. No. 823,261, filed June 26, 1959, now U.S. Pat. No. 3,034,861.

The reaction between the haloamine and the metal or metal amide in accordance with the method of the present invention may be accomplished simply by effecting an intimate contact between the reactants in an anhydrous evironment. Thus, for example, the desired reaction may be achieved by passing the haloamine in the vapor state in contact with particulate solid metal or metal amide. Preferably the gaseous haloamide is diluted with a dry non-reactive gas such as nitrogen, ammonia, and the like.

Alternatively, the reaction between the haloamine and metal or metal amide may be carried out in an anhydrous liquid medium, such as liquid ammonia, diethyl ether, dimethyl formamide and the like. When a liquid medium is employed in the hydrazine synthesis, the medium preferably comprises liquid ammonia. A detailed disclosure of processes which suitably can be employed in accordance with the method of the present invention as the hydrazine forming step are given in applicant's copending application Ser. No. 823,261, filed June 26, 1959, now U.S. Pat. No. 3,034,861.

In the method of the present invention the reaction between the haloamine and metal or metal amide provides an anhydrous mixture comprising hydrazine and metal halide, the exact reactions being given by the following representative equations, wherein M is an alkali metal, X is a halogen, and N and H are the conventional symbols for nitrogen and hydrogen, respectively:

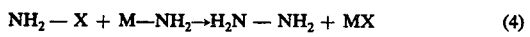

$$NH_2 - X + M-NH_2 \rightarrow H_2N - NH_2 + MX \quad (4)$$

when the amide is employed, and

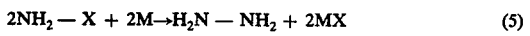

$$2NH_2 - X + 2M \rightarrow H_2N - NH_2 + 2MX \quad (5)$$

when the free metal is used.

In the chamber wherein hydrazine is formed metal halide, unreacted ammonia, are also present. Hydarzine may be recovered from such a mixture by any suitable method such as electrodialysis, evaporation, ion exchange, adsorption and the like. The final product is anhydrous hydrazine and the by-product metal halide and unreacted ammonia are returned to the reaction system.

In accordance with the preferred embodiment of the method of the invention, the mixture of reaction products obtained in the reaction chamber and containing hydrazine are slightly warmed initially to effect evaporation of essentially all of the ammonia therefrom. The resulting ammonia vapors are then recycled in the system to be employed in preparing additional haloamine and metal amide, if the amide is employed in the process in lieu of free metal.

Hydrazine is then separated from the anhydrous residue which contains metal halide and hydrazine and remains after the evaporation of ammonia, by heating the residue gently while passing a small stream of dry nitrogen thereover. The nitrogen serves to strip out hydrazine vapor. The hydrazine then can be separated from the resulting hydrazine-nitrogen gas mixture by passing the mixture over a cold surface, such as is provided by a closed glass tube which is submerged, save for the topmost portion, in ice water. The hydrazine condenses from the gas mixture, and the nitrogen gas vents off. The hydrazine condensate does not freeze in the condenser trap owing to small concentrations of ammonia which are present and which depress the melting point of hydrazine which melts at 1.4° C. Upon heating the condensate in the tube, such as by immersing the bottom thereof in a mineral oil bath, the hydrazine condensate vaporizes and condenses on the cooler upper regions of the tube where it can be collected in purer form.

The metal halide remaining in the residue after the removal of ammonia and the hydrazine therefrom is then passed to an electrolytic cell wherein the metal halide is subjected to electrolysis to provide free metal and free halogen which can be recycled in the system for use in the hydrazine synthesis. The electrolytic cell in which the electrolysis of the anhydrous metal halide is conducted suitably may be any of the conventional types in which the desired results can be obtained. Suitable type of cells include mercury cells and cells in which the halide salt is in a fused state or is dissolved in an anhydrous electrolytic bath solution capable of ionizing the halide salt. Preferably, the electrolysis is carried out in a cell containing an anhydrous bath of a solution of the halide salt in which the halide salt is in ionized form.

In the preferred mode of carrying out the method of the present invention, the electrolysis of the metal halide is carried out by subjecting an anhydrous bath of a solution comprising ammonia and the halide salt to direct current electrolysis. In the electrolysis, free metal and free halogen initially are produced from the metal halide salt which is in an ionized form due to the presence of ammonia in the non-aqueous solution. The free metal and halogen thereby formed each reacts with the ammonia to produce a metal amide and haloamine, respectively, and these intermediates in turn then react with each other, as described above, to provide hydrazine and regenerate the metal halide salt supply.

Although non-aqueous medias such as diethyl ether, formamide, dimethylformamide, and the like containing ammonia dissolved therein suitably may be employed in such an embodiment of the method of the present invention, preferably the bath employed in such an electrolytic process is a solution of the metal halide in liquid ammonia. The electrolytic treatment of these baths suitably can be carried out at any convenient temperature and pressure. In order to reduce the vaporization of ammonia in the bath, however, the temperature and pressure conditions preferably are adjusted to be at or below the dew point of ammonia. Examples of the vapor pressures of ammonia are about 15 p.s.i.a. at $-33.5°$ C. and about 140 p.s.i.a. at 20° C. Usually temperatures in the range of from about $-50°$ to about $+75°$ C. are employed.

During such electrolytic treatments of the halide salt, the metal amide is formed at the cathode of the electrolytic cell and the haloamine is formed at the anode. Since hydrazine forming near the anode would be decomposed, preferably th cathodic and anodic portions of the cell are separated by a diaphragm.

Although hydrazine may be recovered from the bath when the electrolysis is conducted as described above, preferably in order to minimize the proportion of hydrazine decomposed in the cell, portions of the electrolytic solution containing the metal amide and haloamine are removed from the regions of the cathode and anode, respectively, and combined in a separate chamber wherein reaction (4) described above, occurs and hydrazine is formed.

Thus, in accordance with the method of the present invention, the metal halide formed in the preparation of hydrazine as a by-product is continuously treated in the process to provide materials adapted for use in the synthesis and the raw material expenditures attendant the use of the present method are merely those required to provide (a) the initial electrolytic halide salt baths and (b) the amounts of ammonia used up in the hydrazine synthesis.

Figure 2:
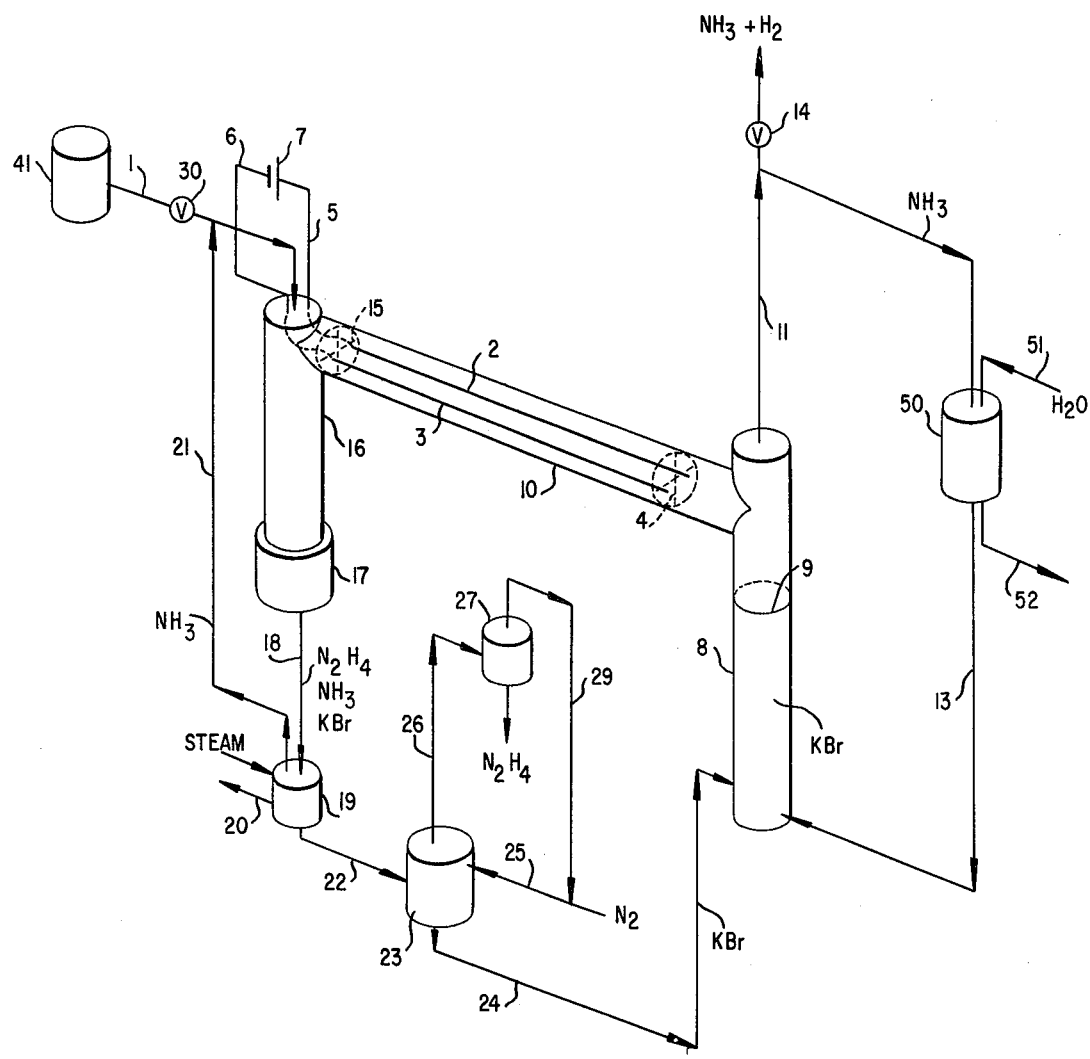

The method of the present invention having been generally described above, the following examples are presented to illustrate specific embodiments thereof but are not given by way of limitation. The examples will be more fully understood by reference to the accompanying drawings of which:

FIG. 1 is a flow diagram of the present process, and
FIG. 2 is a schematic diagram in perspective of one form of apparatus in which the present method suitably may be carried out.

EXAMPLE I

With reference to FIG. 1, chlorine from a chlorine reservoir 1 is passed via line 2 to a chlorine conversion zone 3. In conversion zone 3 the chlorine is contacted and thereby reacted with ammonia introduced thereinto from an ammonia reservoir 4 through line 5 to provide chloramine. The chloramine and any ammonia is removed from the conversion zone 3 via line 6 and passed to a reactor 7.

Metallic sodium from a sodium reservoir 8 is sent by line 9 to a sodium conversion zone 10 wherein it is contacted with ammonia introduced thereinto from reservoir 4 via line 11. In conversion zone 10 sodium amide is formed. The sodium amide and any unreacted ammonia are then removed from conversion zone 10 by line 12 and sent to reactor 7.

In reactor 7 chloramine and sodium amide are contacted under anhydrous conditions and thereby react to provide a mixture of hydrazine and sodium chloride in accordance with reaction (4) given above. The resulting product mixture containing hydrazine, sodium chloride, unreacted ammonia is then removed from reactor 7 by means of line 13 and sent to a separation zone 15. In the separation zone 15 unreacted ammonia is removed from the product mixture and recycled to ammonia reservoir 4 via line 14. Hydrazine is removed from separation zone 15 by means of line 16. A stream of by-product sodium chloride is obtained from separation zone 15 and passed to an electrolytic cell 19 via line 17. In cell 19 sodium chloride is subjected to an electrolytic treatment to provide free chlorine and metallic sodium. Chlorine obtained in cell 19 is then recycled to chlorine reservoir 1 through line 21. Metallic sodium from electrolytic cell 19 is recycled through line 20 to sodium reservoir 8.

EXAMPLE II

With further reference to FIG. 1, the procedure of Example I is repeated with the exception that metallic sodium from sodium reservoir 8 is passed directly to reactor 7 by means of line 22 instead of initially being sent to conversion zone 10 to form sodium amide. In reactor 7 metallic sodium and chloramine introduced thereinto via line 6 react to provide hydrazine and sodium chloride in accordance with reaction (5) described above.

EXAMPLE III

With reference to FIG. 2, a salt reservoir 8 was initially filled to a level 9 with potassium bromide. The complete system was then purged with ammonia vapor introduced thereinto from tank 41 through an inlet valve 30 and exiting therefrom through purge valve 14. Purge valve 14 was then closed and the pressure in the system allowed to build up at room temperature to be in equilibrium with that of tank 41 or about 125 p.s.i.g. Cold water was circulated through condenser 50 by means of lines 51 and 52 to effect the condensation of ammonia in the system. The condensation was allowed to continue until salt reservoir 8, an electrode chamber 10 and an evaporator 16 were filled with liquid ammonia. Electrode chamber 10 was adapted at the end opposite reservoir 8 with a weir 15 which maintained the level of the bath at a predetermined height and when full caused liquid to spill over into evaporator 16 upon the condensation of additional ammonia.

Heat was applied to the liquid in evaporator 16 by means of a heater 17 located at the bottom thereof. In evaporator 16 ammonia was vaporized and passed through the space above the liquid in electrode chamber 10 and line 11 to a condenser 50. In condenser 50 the ammonia vapor was caused to liquify and recycled to salt reservoir 8 via line 13. Inlet valve 30 and purge valve 14 were then adjusted until the amount of ammonia vented through valve 14 was about 20 cc per minute and the level of liquid in evaporator 16 remained essentially constant.

Electrode chamber 10 was provided with a carbon anode 2, an iron cathode 3, and a fiber glass diaphragm 4 which was located between the electrodes.

Direct current was then passed through the bath and the metal halide electrolyzed by applying a voltage across anode 2 and cathode 3 by means of a DC source 7. At equilibrium conditions the voltage applied was 6 volts and the current 0.42 amps.

During the electrolysis bromine was formed at anode 2 and reacted with the ammonia present to provide bromamine. At cathode 3 metallic potassium formed and reacted with ammonia in the bath to provide potassium amide. The continuous recycling of condensed ammonia to salt reservoir 8 caused the level of liquid in electrode chamber 10 to be at such a level that liquids from the anodic and cathodic areas of the cell continuously spilled over weir 15 into evaporator 16 and were mixed with the formation of hydrazine and potassium bromide therein. In evaporator 16 unreacted ammonia was continuously evaporated from the liquid therein by the application thereto of heat from evaporator heater 17 as above described. Residual liquid containing potassium bromide and hydrazine was drawn off from the bottom of evaporator 16 by means of line 18 and passed to an ammonia separator 19 wherein any remaining ammonia was removed by indirect heating with steam passed through jacket 20. The residue containing hydrazine and potassium bromide was then recovered from separator 19 and passed to a hydrazine stripper 23 by means of line 22. In hydrazine stripper 23 hydrazine was stripped from the residue by means of dry nitrogen introduced thereinto through line 25 and the nitrogen-hydrazine gas mixture exited through line 26. Potassium bromide remained in stripper 23 and was then recycled to salt reservoir 8 via line 24. The hydrazine-nitrogen vapor mixture from stripper 23 was then sent to collector 27 by means of line 26 wherein hydrazine was selectively condensed by contacting the cool surfaces thereof. Nitrogen from which the hydrazine had been removed was recycled to stripper 23 through line 28.

The condensate obtained in collector 27 was analyzed for hydrazine by initially dissolving it in 50 cc of water and acidifying the resulting solution with a few drops of hydrochloric acid. About 5 cc of the solution were then added to 100 cc of hot methanol containing B-hydroxy naphthaldehyde. The precipitate which formed exhibited the characteristic yellow fluorescence of B-hydroxy naphthalazine, thus confirming the presence of hydrazine in the product obtained.

EXAMPLE IV

The procedure of Example III was repeated with the exceptions of substituting each in turn sodium bromide, sodium chloride, potassium chloride, potassium fluoride, sodium iodide, magnesium chloride, and barium bromide for potassium bromide.

The test described in Example III confirmed in each case the presence of hydrazine in the product obtained in collector 27.

Although the Examples III and IV are limited to the use of carbon and iron as the anode and cathode, respectively, it will of course be understood that other materials which are conventionally employed as electrodes in electrolytic cells of the type described and which are inert with respect to the constituents in the bath suitably may be employed in such embodiments of the method of the invention. The term "inert" as employed herein is meant to refer to those materials employed as electrodes which are not altered chemically or physically by the constituents in the electrolytic bath. Hence, materials which exert catalytic influences upon the desired reactions in the cell suitably may be employed. For example, the iron cathode employed in Examples III and IV acts as a catalyst for reaction between the free metal plating out of the bath and ammonia wherein the metal amide is formed.

It also will be understood that inert materials which act as catalysts for the desired reactions carried out in embodiments of the present method such as described in Examples III and IV also suitably may be present in the bath in forms other than the electrodes. For example, an uncharged iron wire satisfactorily could be immersed in the electrolytic bath adjacent to the cathode.

In accordance with the method of the present invention the diaphragm employed in Examples III and IV suitably may be formed of materials other than that specifically described, fiber glass. Such suitable materials are those commonly employed in forming diaphragms including those which hinder the migration of ions through the electrolytic bath by physical means and/or by permselective action.

Although variations and modifications of the method of the present invention will be apparent from the general description and specific embodiments thereof given in the specification, it is intended that the present invention be limited only by the scope of the appended claims.

What is claimed is:

1. A continuous cyclic process for preparing hydrazine comprising the step of:
    (a) contacting in a non-aqueous medium at least one haloamine of the formula $NH_2$—X, where X is a halogen, with at least one material selected from the group consisting of the metals of Groups IA and IIA and the amides thereof to provide an anhydrous mixture containing hydrazine and a metal halide;
    (b) separating said hydrazine from said anhydrous mixture;
    (c) subjecting the hydrazine-poor residue of step (b) to direct current electrolysis to separate the metal component and the halogen component of said metal halide from each other; and
    (d) recycling said metal for reaction with fresh haloamine in step (a).

2. A process in accordance with claim 1 comprising the additional steps of:
    (e) reacting halogen obtained in said electrolysis step with ammonia to provide a haloamine of the formula $NH_2$—X wherein X is said halogen; and
    (f) recycling the haloamine of step (e) to the hydrazine-forming reaction of step (a).

3. A process in accordance with claim 1 in which said metal obtained in said electrolysis is first reacted with ammonia to provide a metal amide prior to recycle of said metal to step (a).

4. A process in accordance with claim 2 in which said metal obtained in said electrolysis is first reacted with ammonia to provide a metal amide prior to recycle of said metal to step (a).

5. The process for preparing hydrazine according to claim 1 wherein said haloamine is bromamine.

6. The process for preparing hydrazine according to claim 1 wherein said haloamine is chloramine.

7. The process for preparing hydrazine according to claim 1 wherein said haloamine is fluoramine.

8. A continuous cyclic process for preparing hydrazine comprising the steps of:
    (a) contacting in a non-aqueous medium containing ammonia at least one haloamine of the formula $NH_2$—X, wherein X is a halogen, with at least one material selected from the group consisting of the metals of Groups IA and IIA and the amides thereof to provide an anhydrous mixture containing hydrazine and a metal halide;
    (b) separating said hydrazine from said anhydrous mixture;
    (c) subjecting the hydrazine-poor residue of step (b) to direct current electrolysis to provide metal amide at the electrolysis cathode and haloamine at the electrolysis anode;
    (d) recycling said metal amide of step (c) to hydrazine-forming step (a);
    (e) recycling said haloamine of step (c) to hydrazine-forming step (a); and
    (f) continuing said contacting and recycling to continuously produce hydrazine.

9. A process for preparing hydrazine in accordance with claim 8 in which the reactants of step (a) are chloramine and potassium amide.

10. A process for preparing hydrazine in accordance with claim 8 in which the reactants of step (a) are chloramine and sodium amide.

11. A process for preparing hydrazine in accordance with claim 8 in which the reactants of step (a) are chloramine and barium amide.

12. A process for preparing hydrazine in accordance with claim 8 in which the reactants of step (a) are bromamine and potassium amide.

13. A process for preparing hydrazine in accordance with claim 8 in which the reactants of step (a) are bromamine and sodium amide.

14. The process for preparing hydrazine according to claim 8 wherein said haloamine is bromamine.

15. The process for preparing hydrazine according to claim 8 wherein said haloamine is chloramine.

16. The process for preparing hydrazine according to claim 8 wherein said haloamine is fluoramine.

* * * * *